United States Patent
Addeo et al.

(10) Patent No.: US 8,270,300 B2
(45) Date of Patent: Sep. 18, 2012

(54) EXTENSION TO RSVP PROTOCOL FOR SUPPORTING OAM CONFIGURATION

(75) Inventors: Christian Addeo, Pordenone (IT); Italo Busi, Cerro Maggiore (IT)

(73) Assignee: Alcatel Lucent, Paris (FR)

( * ) Notice: Subject to any disclaimer, the term of this patent is extended or adjusted under 35 U.S.C. 154(b) by 787 days.

(21) Appl. No.: 11/435,829

(22) Filed: May 18, 2006

(65) Prior Publication Data

US 2006/0262728 A1 Nov. 23, 2006

(30) Foreign Application Priority Data

May 23, 2005 (EP) .................................. 05291106

(51) Int. Cl.
H04L 12/26 (2006.01)
(52) U.S. Cl. .................................................. 370/236.2
(58) Field of Classification Search .......... 370/254–255, 370/474–477, 464, 236–241.1, 248, 249, 370/389, 392, 401, 229–231, 235, 351, 400, 370/410; 455/7, 11.1
See application file for complete search history.

(56) References Cited

U.S. PATENT DOCUMENTS

| | | | |
|---|---|---|---|
| 5,940,400 A * | 8/1999 | Eastmond et al. ............ | 370/445 |
| 6,295,284 B1 * | 9/2001 | Maggenti ...................... | 370/328 |
| 6,560,654 B1 * | 5/2003 | Fedyk et al. .................. | 709/239 |
| 7,177,295 B1 * | 2/2007 | Sholander et al. ............ | 370/338 |
| 7,403,490 B2 * | 7/2008 | Lim et al. ...................... | 370/254 |
| 7,558,199 B1 * | 7/2009 | Minei et al. ................... | 370/230 |
| 2002/0087699 A1 * | 7/2002 | Karagiannis et al. ......... | 709/227 |
| 2002/0191572 A1 * | 12/2002 | Weinstein et al. ............ | 370/338 |

(Continued)

FOREIGN PATENT DOCUMENTS

EP 1 041 234 A 10/2000

OTHER PUBLICATIONS

Drake (Boeing) et al: "Generalized MPLS (GMPLS) RSVP-TE Signalling in support of Automatically Switched Optical Network (ASON)" IETF Standard-Working-Draft, Internet Engineering Task Force, IETF, CH, vol. ccamp, No. 3, Feb. 2005, XP015038135.

(Continued)

*Primary Examiner* — Anh-Vu H Ly
*Assistant Examiner* — Omar Ghowrwal
(74) *Attorney, Agent, or Firm* — Carmen Patti Law Group, LLC

(57) ABSTRACT

A method is described for checking support of a function at network elements of a telecommunication network, like an operation and management function. The telecommunication network includes a source, a destination and intermediate control plane elements interconnected through a signalling protocol for controlling a source, a destination and intermediate network elements respectively for configuration of a connection from the source to the destination network element crossing the intermediate network elements. The method includes the step, in case the connection is not configured, of transmitting a first message from the source to the destination control plane element crossing the intermediate control plane elements for indicating a request of the configuration of the connection and including a first field for indicating a request of the check of support of the function at each network element of the connection and the step of receiving at the source control plane element a second message transmitted from the destination control plane element for indicating an answer to the request and including the first field for indicating if the function is supported at each network element of the connection.

23 Claims, 2 Drawing Sheets

U.S. PATENT DOCUMENTS

| | | | |
|---|---|---|---|
| 2003/0110276 A1* | 6/2003 | Riddle | 709/230 |
| 2003/0115332 A1* | 6/2003 | Honeisen | 709/227 |
| 2003/0137960 A1 | 7/2003 | Greis | |
| 2003/0202469 A1* | 10/2003 | Cain | 370/230 |
| 2004/0008689 A1* | 1/2004 | Westphal et al. | 370/395.21 |
| 2004/0107298 A1 | 6/2004 | Westphal | |
| 2004/0170431 A1* | 9/2004 | Maciocco et al. | 398/48 |
| 2004/0199641 A1* | 10/2004 | Bajko | 709/227 |
| 2004/0203816 A1* | 10/2004 | Bae et al. | 455/450 |
| 2005/0048913 A1* | 3/2005 | Bender et al. | 455/7 |
| 2005/0105905 A1 | 5/2005 | Ovadia et al. | |
| 2005/0111418 A1* | 5/2005 | Yang et al. | 370/338 |
| 2006/0101159 A1* | 5/2006 | Yeh et al. | 709/246 |
| 2006/0203717 A1* | 9/2006 | Puppa et al. | 370/216 |

OTHER PUBLICATIONS

Fankhauser G et al: "Reservation-based Charging in an Integrated Services Network" 4th Informs Telecommunications Conference, Mar. 1998, XP002175494.

International Telecommunication Union: "Series G: Transmission Systems and Media Digital Systems and Networks—Digital networks—General aspects—Characteristics of transport equipment—Description methodology and generic functionality—Characteristics of transport equipment—Description methodology and generic functionality." G.806, Oct. 2000.

International Telecommunication Union: "Series G: Transmission Systems and Media Digital Systems and Networks—Digital transmission systems—Terminal equipments—Principal characteristics of multiplexing equipment for the synchronous digital hierarchy—Characteristics of synchronous digital hierarchy (SDH) equipment functional blocks." G.783, Apr. 1997.

International Telecommunication Union: "Series G: Transmission Systems and Media Digital Systems and Networks—Digital terminal equipments—Operations, administration and maintenance features of transmission equipment—Series Y: Global Information Infrastructure, Internet Protocol Aspects and Next Generation Networks—Internet protocol aspects—Operation, administration and maintenance—Distributed call and connection management (DCM) based on PNNI." G.7713.1/Y.1704.1, Mar. 2003.

International Telecommunication Union: "Series G: Transmission Systems and Media Digital Systems and Networks—Digital terminal equipments—Operations, administration and maintenance features of transmission equipment—Series Y: Global Information Infrastructure, Internet Protocol Aspects and Next Generation Networks—Internet protocol aspects—Operation, administration and maintenance—Distributed call and connection management (DCM)." G.7713/Y.1704, Dec. 2001.

International Telecommunication Union: "Series Y: Global Information Infrastructure, Internet Protocol Aspects and Next Generation Networks—Internet protocol aspects—Operation, administration and maintenance—Operation & Maintenance mechanism for MPLS networks." Y.1711, Feb. 2004.

International Telecommunication Union: "Series Y: Global Information Infrastructure, Internet Protocol Aspects and Next Generation Networks—Internet protocol aspects—Operation, administration and maintenance—Requirements for OAM functions in Ethernet-based networks and Ethernet services." Y.1730, Jan. 2004.

\* cited by examiner

EXTENSION TO RSVP PROTOCOL FOR SUPPORTING OAM CONFIGURATION

FIELD OF THE INVENTION

The present invention relates to the telecommunication field and more in particular to the Resource Reservation Protocol—Traffic Engineering (RSVP-TE). Still more in particular, the invention concerns a method for checking support of a function at network elements of a connection.

This application is based on, and claims the benefit of, European Patent Application No. 05291106.2 filed on May 23, 2005, which is incorporated by reference herein.

BACKGROUND OF THE INVENTION

The new network architectures are based on the Automatically Switched Optical Network (ASON) defined in ITU-T G.8080/Y.1304 (11/2001), wherein control plane elements (CPEs) are interconnected each other and communicate according to a signalling protocol. Each CPE controls one or more network elements (NE), also defined Transport Plane Elements (TPE), for configuration of the connections starting from the controlled network element (also defined source network element), in order to provide a fast detection of a failure, a fast and efficient configuration of new connections within the Transport Plane, modify the connections previously set up and perform a faster restoration function providing backup connections for protecting connections affected by a failure. Various signalling protocols can fit the ASON architecture, like the Resource Reservation Protocol (RSVP) defined in RFC2205, RFC2209 and RFC2750, the Resource Reservation Protocol-Traffic Engineering (RSVP-TE) defined in RFC3209 and ITU-T G.7713.2, the Label Distribution Protocol (LDP) defined in RFC3036, the Constraint Based-Label Distribution Protocol (CR-LDP) defined in ITU-T G.7713.3 and RFC3472, the Private Network to Network Interface (PNNI) defined in ITU-T G.7713.1.

Referring to RSVP protocol, the base specification was designed to allow network elements (routers) to decide in advance, that is before the provisioning of the connection, if the network can meet the requirements of a Quality of Service (QoS) defined for the connection. The configuration of a new connection is performed transmitting a Path message and receiving, in case of a successful configuration of the connection, a Resv message in the reverse direction of the Path message or receiving a PathErr message in case of an unsuccessful configuration (for example for lack of network resources). Each RSVP message (Path, Resv, PathErr, ResvErr, PathTear, ResvTear, ResvConf) is composed of a common header followed by a body consisting of a variable number (of variable length) of objects. The common header is composed of 8 bytes:

```
        0               1               2               3
+---------------+---------------+---------------+---------------+
| Vers | Flags |   Msg Type    |         RSVP Checksum         |
+---------------+---------------+---------------+---------------+
|   Send_TTL    |  (Reserved)   |          RSVP Length          |
+---------------+---------------+---------------+---------------+
```

It includes the field "Msg Type" (1 byte) for uniquely identifying the type of message and includes the field "RSVP Length" (2 bytes) for indicating the total length (in bytes) of the corresponding message, including the common header and the variable-length objects that follow. Every object is composed of an header (4 bytes) followed by the object content:

```
        0               1               2               3
+---------------+---------------+---------------+---------------+
|        Length (bytes)         |   Class-Num   |    C-Type     |
+---------------+---------------+---------------+---------------+
|                                                               |
//                        (Object content)                     //
|                                                               |
+---------------+---------------+---------------+---------------+
```

The object header includes the field "Length" (2 bytes) for indicating the total length (in bytes) of the corresponding object and includes the field "Class-Num" (1 byte) for uniquely identifying the object.

The Path message, like every RSVP message, includes the common header followed by the following objects:

```
<Path message> ::=< common header >
    [ <INTEGRITY> ]
    <SESSION> <RSVP_HOP>
    <TIME_VALUES>
    [ <POLICY_DATA> ]
    <sender descriptor>
``` wherein the square parenthesis, that is [ ], indicate an optional object. The <SESSION> object includes the IP destination address and the <TIME_VALUES> object includes the value of the refresh period. The <sender descriptor> includes the following objects:

```
<sender descriptor> ::=
    <SENDER_TEMPLATE>
    <SENDER_TSPEC>
    [ <ADSPEC> ]
    [ <RECORD_ROUTE> ]
```

The <SENDER_TEMPLATE> object includes the sender IP address and the <SENDER_TSPEC> object defines the traffic characteristics of the sender's data flow.

The Resv message includes the common header followed by the following objects:

```
<Resv message>::=< common header >
    [ <INTEGRITY> ]
    <SESSION> <RSVP_HOP>
    <TIME_VALUES>
    [ <RESV_CONFIRM> ] [ <SCOPE> ]
    [ <POLICY_DATA> ]
    <STYLE>
    <flow descriptor list>
``` wherein

```
<flow descriptor list> ::= <FF flow descriptor list> |
<SE flow descriptor list>;
<FF flow descriptor list> ::= <FLOWSPEC>
    <FILTER_SPEC>
    <LABEL>
    [ <RECORD_ROUTE> ] |
    <FF flow descriptor list>> <FF flow descriptor>;
<FF flow descriptor> ::= <FLOWSPEC>
    <FILTER_SPEC>
    <LABEL>
    [ <RECORD_ROUTE> ];
and wherein
<SE flow descriptor list> ::= <FLOWSPEC>
    <SE filter spec list >;
<SE filter spec list >::= <SE filter spec> | <SE filter spec list>
    <SE filter spec>;
<SE filter spec>::= <FILTER_SPEC>
    <LABEL>
    [ <RECORD_ROUTE> ].
```

A number of extensions were added to support provisioning and maintenance of explicitly routed connections (defined LSP=label switched paths). Finally, RSVP-TE allows the aggregation of connections, defined LSP tunnels, which share a common route and a common pool of shared network resources, reducing the amount of information carried in the network.

The Multi-Protocol Label Switching (indicated with MPLS), which is basically defined in RFC3031(January, 2001) represents an effort in the continued evolution of multi-layer switching, bringing efficiencies in data forwarding, Qos and traffic engineering management. In a traditional connectionless network (for example IP network), every network element (router) runs a layer-3 routing algorithm to determine the path of the data packet through the network; each network element makes an independent forwarding decision, using the information included in the packet header (for example, the destination IP address) and the information obtained from the routing algorithm. This is a slow process, expecially when the forwarding database includes many entries and QoS parameters. On the contrary, in an MPLS network the optimum path through the network is calculated in advance and a label is assigned in front of the data packet; this label accompanies the data packet as it traverses the nework and network elements along the path use this label to determine the next hope network element. Each network element maintains a forwarding database that maps an incoming label/interface with an outgoing label/interface; this switching can be applied to different technologies (IP=Internet Protocol, ATM=Asynchronous Transfer Mode, FR=Frame Relay). The path taken by the labeled packets is called Label Switched Path (LSP). The advantage is that processor-intensive analysis occurs only at the source network element, while the subsequent network elements along the path manipulate this label at hardware level and thus can perform a fast switching, because the forwarding decisions are based on (few) labels rather than on the destination IP address.

Operation, administration and management functions (indicated with OAM) are defined for monitoring traffic carried over a connection, from a source to a destination network element. OAM functions includes for example:
  localization of a fault affecting a connection;
  checking integrity of a connection: for example a source network element continually generates a dedicated message and a sink network element continually checks to receive this message;
  indication of a fault affecting a segment of a connection to the downstream and upstream network elements of the connection: the downstream indication is usually indicated with Alarm Indication Signal (AIS), while the upstream with Remote Defect Indication (RDI).

OAM functions are defined for many known protocols, like SDH/SONET, ATM and Ethernet. Specifically, OAM functions for SDH are defined in ITU-T G.806 and ITU-T G.783. The SDH frame includes bytes for performing the OAM functions of the different layers, that is regenerator, section, high-order path and low-order path layers. The SDH frame includes the RSOH including bytes (B1, J0) for monitoring the regenerator layer, the MSOH including bytes (B2, K1, K2) for monitoring the section layer, the high-order POH including bytes (J1, B3, C2, G1, H4, N1) for monitoring the high-order path layer and the low-order POH including bytes (V5, B3, J2, N2) for monitoring the low-order path layer. OAM functions for ATM are defined in ITU-T I.610. Dedicated OAM cells are defined for monitoring a Virtual Path (VP) or a Virtual Channel (VC), either at segment level or at end-to-end level; each cell includes a type field (fault management, performance management, APS protocol, activation/deactivation) and a corresponding function field (for example AIS/RDI/Continuity Check for fault management). Activation of OAM functions for a VP/VC can be performed according to two different solutions. In the first solution the ATM manager controls directly both the source and the destination network element for activation of the OAM functions according to the following steps:
  the VP/VC is previously set up;
  the ATM manager sends to the source network element of the corresponding VP/VC a message for indicating activation of a particular OAM function at the source network element, for example the source network element starts to transmit Continuity Check (CC) cells;
  the ATM manager sends to the destination network element of the same corresponding VP/VC a message for indicating activation of the OAM function at the destination network element, that is the destination network element starts to check to receive the CC cells.
In the second solution the ATM manager controls directly only the source network element for activation of the OAM functions according to the following steps:
  the VP/VC is previously set up;
  the ATM manager sends to the source network element of the corresponding VP/VC a message for indicating a request of activation of a particular OAM function at the source network element, for example transmission of CC cells;
  after receiving the request, the source network element transmits to the destination network element OAM activation cells for indicating a request of activation of the OAM function at the destination network element, that is to check to receive the CC cells;
  after receiving the request, the destination network element transmits to the source network element a confirmation to the request;
  when the source network element receives the confirmation to the request, the source network element starts to transmit the CC OAM cells to the destination network element.
Therefore ATM requires that the VP/VC is previously set up and afterwards the OAM functions are activated. Moreover, the request of activation is sent only to the source and destination network elements and not to the intermediate network elements; this is possible because OAM functions at the intermediate network elements are supported by default, meaning that it is mandatory for a network element compliant to ATM protocol to provide OAM functions and it is only required to activate these functions, through the transmission of a message of activation from the central manager to the source and destination network elements (first solution) or alternatevely through the transmission of a request of activation from the central manager to the source network element and through the transmission of the activation cells from the source to the destination network element crossing the intermediate network elements.

Link Management Protocol (LMP), defined by Internet draft draft-ietf-ccamp-lmp-10.txt (October, 2003) issued by IETF and updated periodically, specifies a protocol which runs between two adiacent network elements (defined link) and is used to manage TE links, to maintain control channel connectivity, verify the physical connectivity of the data links, correlate the link property information, suppress downstream alarms and localize link failures for protection/restoration purposes. LMP further specifies on paragraph 6.4 that a ChannelStatus message can be used to notify a neighbour that the data link should be actively monitored and that the neighbour must transmit a ChannelStatusAck upon receipt of the ChannelStatus message. Thus LMP can be used only for activation of monitoring of the data link between two adiacent network elements and not for activation of monitoring at all the network elements of a connection, which can include many links.

OAM functions for MPLS are defined in ITU-T Y.1711 (2/2004). Dedicated OAM packets, identified from the user traffic by a reserved value (14) of a label, are defined for monitoring a MPLS path; each MPLS OAM packet includes a function field for indicating Connectivity Verification (CV), Fast Failure Detection (FFD), Forward Defect Indicator (FDI), Backward Defect Indicator (BDI). MPLS OAM packets are transmitted periodically from the source to the destination network element of the LSP. Each MPLS OAM packet further includes in the last two bytes a BIP16 to detect errors of the packet. This standard defines that intermediate network elements transparently forwards the received MPLS OAM packets to the destination network element and defines that a destination network element which does not support the MPLS OAM functionality will drop the received MPLS OAM packets; this has the disadvantage that, in case an intermediate network element supports and activates transmission of MPLS OAM packets, the destination network element (not supporting the MPLS OAM functionality) continually receives and drops the MPLS OAM packets, thus increasing the management traffic. Moreover, this standard defines that processing of a CV or FFD packet should be activated after a LSP is set up, in order to ensure that alarms are correctly enabled.

Therefore OAM functions for MPLS can be supported or not supported by a network element and the problem to check if OAM functions are supported by each network element of a connection arises. This check is also required not only for MPLS, but also for any other protocol, for example in case the network elements of a connection belong to different vendors or to different network domains each one controlled by a different central network manager. In fact in the first case an OAM function could be supported only by network elements of a first vendor and not by a second one, while in the second case each manager can check only if the OAM functions are supported by the network elements of the controlled domain and not by each network element of the entire connection. Referring for example to SDH protocol, the Tandem Connection Monitoring (TCM) function is not supported by default by all vendors, or it is supported according to different solutions; therefore it is required to know if TCM is supported by each network element of the connection or if each network element is compliant to a specified TCM version.

OAM functions for Ethernet are defined schematically in ITU-T Y.1730 (1/2004) and includes:
  continuous connectivity check;
  fault propagation/alarm suppression functions;
  intrusive and non-intrusive loopback;
  fault isolation (traceroute);
  discovery;
  performance monitoring.
  survivability functions (e.g., protection switching, restoration).

Finally, the problem to check if OAM functions are supported by each network element of a connection can be generalized to the problem to check if a generic function is supported by each network element of a connection, like for example:
  if each network element is running a specified software release;
  if each network element can support performance monitoring functionality and specific performance monitoring functions.

A straightforward solution to the problem to check if OAM functions are supported by each network element of a connection could be to use a central network manager, controlling all the network elements of the connection. The manager checks if the OAM functions are supported by each network element of the connection by transmitting a first message to each network element of the connection for indicating a request of check if the OAM functions are supported and receiving from each network element a second message for indicating if the OAM functions are supported at the corresponding network element. This solution has the following disadvantages:
  it requires a long time because the connection usually includes many network elements and because the bandwidth available for communication between manager and each network element is limited (for example DCC=Data Communications Channels for SDH);
  it increases management traffic compared to user data traffic in the network, because the manager must communicate with each network element;
  the network elements could belong to different network domains controlled by different network managers and in this case a cooperation between the managers is required for communicating with all network elements of the connection.

The problem to check if a function is supported by each network element of a connection is not addressed by RSVP, which is a protocol defined expecially for checking if a predefined quality of service for a connection is fulfilled and for configuration of this connection.

SUMMARY OF THE INVENTION

In view of drawbacks of the known solutions, the main object of the present invention is to provide a method for checking in a telecommunication network support of a function at network elements of a connection. This object is achieved by a method according to claims 1 or 2, by a message of a signalling protocol according to claim 13, by a control plane element according to claims 15, 17 or 19 and by a network node according to claims 16, 18 or 20. The basic idea is to extend the messages of a signalling protocol (for example RSVP) including objects for configuration of a connection in order to further include a new object for checking if a function is supported at each network element of the connection. The advantages are:
- to require a short time for the check also in case the connection includes many network elements, because it is required a communication only between the central manager and the source network element and not between the central manager and each network element;
- to require a short time also because the bandwidth available for the control channel is greater (and more reliable) than the bandwidth available between the manager and each network element;
- not to increase the network management traffic, because the same messages used for configuration of the connections are also used for the check and because management traffic is transmitted only if all the network elements of the connection support the function;
- the network elements can also belong to different vendors or different network domains, because the signalling protocol (like the RSVP) is defined by a standard and network elements of different vendors can communicate each other if compliant to the standard.

A further object of the invention is, in case the function is supported at each network element of the connection, to extend the new object of the signalling protocol further including fields for checking support of a configuration parameter value of a specific function. This is achieved by a method according to claim 5, by a message according to claim 14, by a control plane element according to claim 15 and by a network node according to claim 16.

BEST MODE FOR CARRYING OUT THE INVENTION

The method is described specifically for the RSVP protocol and for checking support of MPLS OAM functions. In order to perform the invention, a new optional object is added in the Path and Resv messages after the <RECORD_ROUTE> object and this object is defined <LSP_ADDINFO>, wherein LSP stands for "Label Switched Path", ADDINFO stands for "Additional Information"; this new object is identified by a new value of the Class-Num field (for example value=160, in decimal) of the object header. Thus the new format of the <sender descriptor> of the Path message is the following one:

<sender descriptor> ::=
    <SENDER_TEMPLATE>
    <SENDER_TSPEC>
    [ <ADSPEC> ]
    [ <RECORD_ROUTE> ]
    [ <LSP_ADDINFO> ]

This new optional object is also added in the Resv message after the <RECORD_ROUTE> object of the <FF flow descriptor list> or of the <FF flow descriptor> or of the <SE filter spec>.

Figure 1:
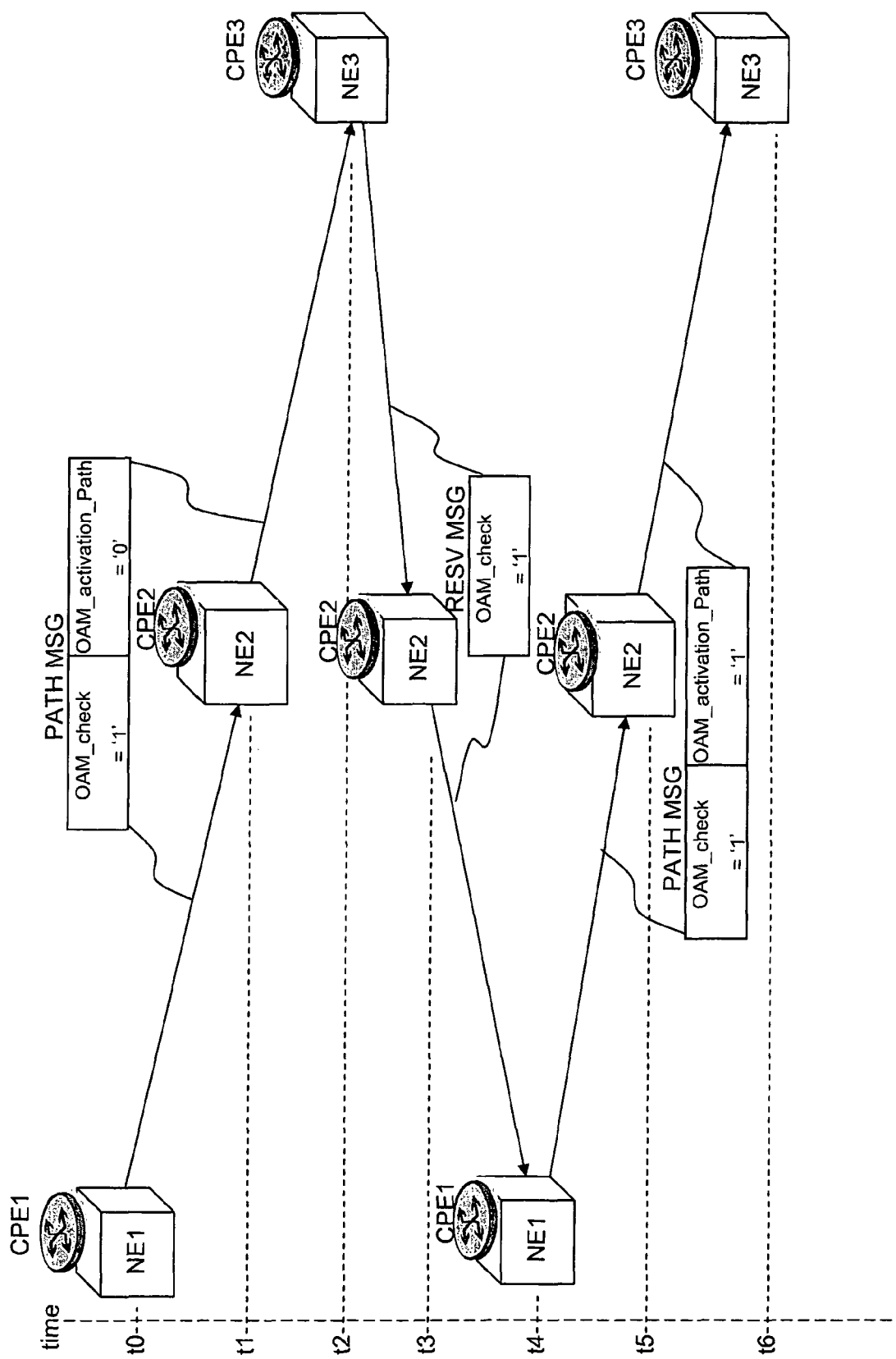
FIG. 1 shows schematically the fields of a new object carried by the messages exchanged between three control plane elements controlling three corresponding network elements of a connection for checking support of OAM functions of a connection.

The LSP_ADDINFO object carryed by the Path and Resv messages includes the common header and an object body. The object body includes specific fields for performing the invention and in particular:
- at least one bit indicated with OAM_check;
- at least one bit indicated with OAM_activation_Path;

wherein the "_Path" suffix is required for indicating that the OAM_activation_Path field is meaningful only when carried by the Path message. The first field OAM_check (one bit in this example) is required for checking if OAM functions are supported at each network element of a connection from a source to a destination network element, crossing at least one intermediate network element; the second field OAM_activation_Path (one bit in this example) is required, in case of supporting the OAM functions, for requesting activation of the functions at each network element of the connection. FIG. 1 shows schematically the steps required for performing the check, wherein a source control plane element (indicated with CPE1) controls the source network element (indicated with NE1), an intermediate control plane element (indicated with CPE2) controls the intermediate network element (indicated with NE2) and a destination control plane element (indicated with CPE3) controls the destination network element (indicated with NE3). FIG. 1 shows only one intermediate network element, but the connection can include more than one intermediate network element. FIG. 1 also shows OAM_check and OAM_activation_Path bits of the new LSP_ADDINFO object of the Path message and OAM_check bit of the new LSP_ADDINFO object of the Resv message, the corresponding values required for performing the check and for requesting the activation and the time evolution.

Activation of an MPLS OAM function is performed according to a two steps procedure. The first step starts at time=t0, when the connection (a LSP in case of a MPLS network) from NE1 to NE3 crossing NE2 is not yet set up; thus at time=t0 CPE1 transmits a Path message to CPE3 for requesting configuration of the connection according to a defined quality of service, by assigning one or more bits according to known techniques. Referring to RSVP, this is performed through the <SENDER_TSPEC> object. At the same time=t0 the OAM_check bit of the Path message is assigned to value '1' for indicating a request of check if the OAM functions are supported at each network element of the connection. The Path message crosses each intermediate CPE of the connection; specifically, it is received by CPE2 at time=t1 and, in case of supporting MPLS OAM functions at NE2, the Path message is transmitted keeping the OAM_check='1' to the adiacent control plane element (destination CPE3 in this example) controlling the subsequent network element of the connection for indicating that the MPLS OAM functions are supported at each network element of the connection comprised between the source and the intermediate NE. On the contrary, in case an intermediate CPE does not support MPLS OAM functions at the controlled intermediate NE, OAM_check bit of the transmitted Path message is assigned to value '0' for indicating that the MPLS OAM functions are not supported at the controlled intermediate NE; in this case, each subsequent intermediate CPE receives the Path message including OAM_check='0' indicating that at least one previous intermediate NE does not support the MPLS OAM functions and afterwards this Path message is transmitted to the adiacent CPE towards the destination CPE keeping OAM_check='0'. Thus each intermediate CPE receiving the Path message including OAM check='1' transmits, in case of supporting MPLS OAM functions at the controlled intermediate NE, the Path message including OAM_check='1' to the subsequent CPE towards the destination CPE. If the Path message including OAM_check='1' is received at the destination CPE3 at time=t2, CPE3 transmits, in case of supporting MPLS OAM functions at the destination NE3, a Resv message in the reverse direction towards CPE1, assigning OAM_check='1': this is the indication that the MPLS OAM functions are supported at each NE of the connection, because the Path message has crossed the CPEs controlling each NE of the connection and each CPE has successfully checked the support of the MPLS OAM functions at the controlled NE. On the contrary, in case CPE3 receives the Path message including OAM_check='1' but the destination CPE does not support MPLS OAM functions at the destination NE, OAM_check bit of the Resv message is assigned to value '0' for indicating that the MPLS OAM functions are not supported at at least one network element of the connection (in this case only at NE3) and also in case CPE3 receives the Path message including OAM_check='0' (because at least one previous NE of the connection does not support the MPLS OAM functions), OAM_check bit of the Resv message is assigned to value '0' for indicating that the MPLS OAM functions are not supported at least one network element of the connection (which can be NE1, NE2 or NE3). CPE2 receives at time=t3 the Resv message (including OAM_check='1' or ='0') and it transmits the Resv message to CPE1 keeping OAM_check unchanged. If CPE1 receives at time=t4 the Resv message including OAM_check='1', this indicates that MPLS OAM functions are supported at each network element (NE1, NE2, NE3 in this example) of the connection and this is the end of the first step. On the contrary, if CPE1 receives at time=t4 the Resv message including OAM_check='0', this indicates that the MPLS OAM functions are not supported at least one network element of the connection (NE1, NE2 or NE3 in this example). In case of not supporting the MPLS OAM functions, the method can be further improved including one or more new fields of the LSP_ADDINFO object of the Path and Resv messages, in order to mark (during transmission of the Path message) the NEs not supporting the MPLS OAM functions and in order to notify this information to the source CPE (through the transmission of Resv message). CPE1 can alternatively detect that MPLS OAM functions are not supported not only assigning OAM_check='1' in the Path message and receiving OAM_check='0' in the Resv message, but also assigning OAM_check='1' in the Path message and receiving the Resv message not including the optional LSP_ADDINFO object. For example, an intermediate CPE which does not recognize the LSP_ADDINFO object of the received Path message can drop this object from the Path message transmitted towards the destination CPE; accordingly, the destination CPE not recognizing the LSP_ADDINFO object of the received Path message can drop this object from the Resv message transmitted towards the source CPE. Finally, the source CPE, which has previously transmitted the Path message including the LSP_ADDINFO object (and OAM_check='1'), receives a Resv message not including the LSP_ADDINFO object and it can detect that the MPLS OAM functions are not supported.

The second step starts at time=t4 after receiving the Resv message including OAM_check='1': the source CPE1 transmits a Path message including OAM_activation_Path='1' for requesting activation of MPLS OAM functions at each network element of the connection and afterwards the MPLS OAM functions are activated at the source NE1, that is NE1 starts to transmit OAM packets to NE2. At time=t5 intermediate CPE2 receives the Path message including OAM_activation_Path='1', then it transmits the Path message to CPE3 keeping OAM_activation_Path='1' unchanged and afterwards the MPLS OAM functions are activated at the intermediate NE2, that is NE2 starts to transmit OAM packets to NE3. Finally, a time=t6 destination CPE3 receives the Path message including OAM_activation_Path='1' and afterwards the MPLS OAM functions are activated at destination NE3, that is OAM packets are processed at NE3 for monitoring the connection from NE1 to NE3 crossing NE2 and this is the end of the second step.

The above procedure has also the advantage, in case of activation of MPLS OAM functions of an MPLS network, to ensure correct time activation of processing of a CV or FFD packet, because the destination network element receives the first MPLS OAM packet immediately after the destination network element has activated processing of the MPLS OAM packet.

In case of supporting MPLS OAM functions at each network element of the connection, the invention can advantageously be used also for checking support of a configuration parameter value of a specific function; for example, Fast Failure Detection (FFD) function is used to detect connection monitoring at a smaller timescale compared to Connectivity Verification (CV) functionality. In case of supporting and activating the FFD function, the default generation period is 50 ms (ms=milliseconds), but according to ITU-T Y.1711 this parameter can be comprised between 10 ms and 500 ms. Therefore the Path and Resv messages can be extended to further check if a configuration parameter value (for example a smaller value of 20 ms) of a specific function (the FFD function) can be supported at each network element of the connection. This is achieved further adding in the LSP_ADDINFO object of the Path and Resv messages the following fields:

at least one bit indicated with FFD_check;
at least one bit indicated with FFD_timer.

Figure 2:
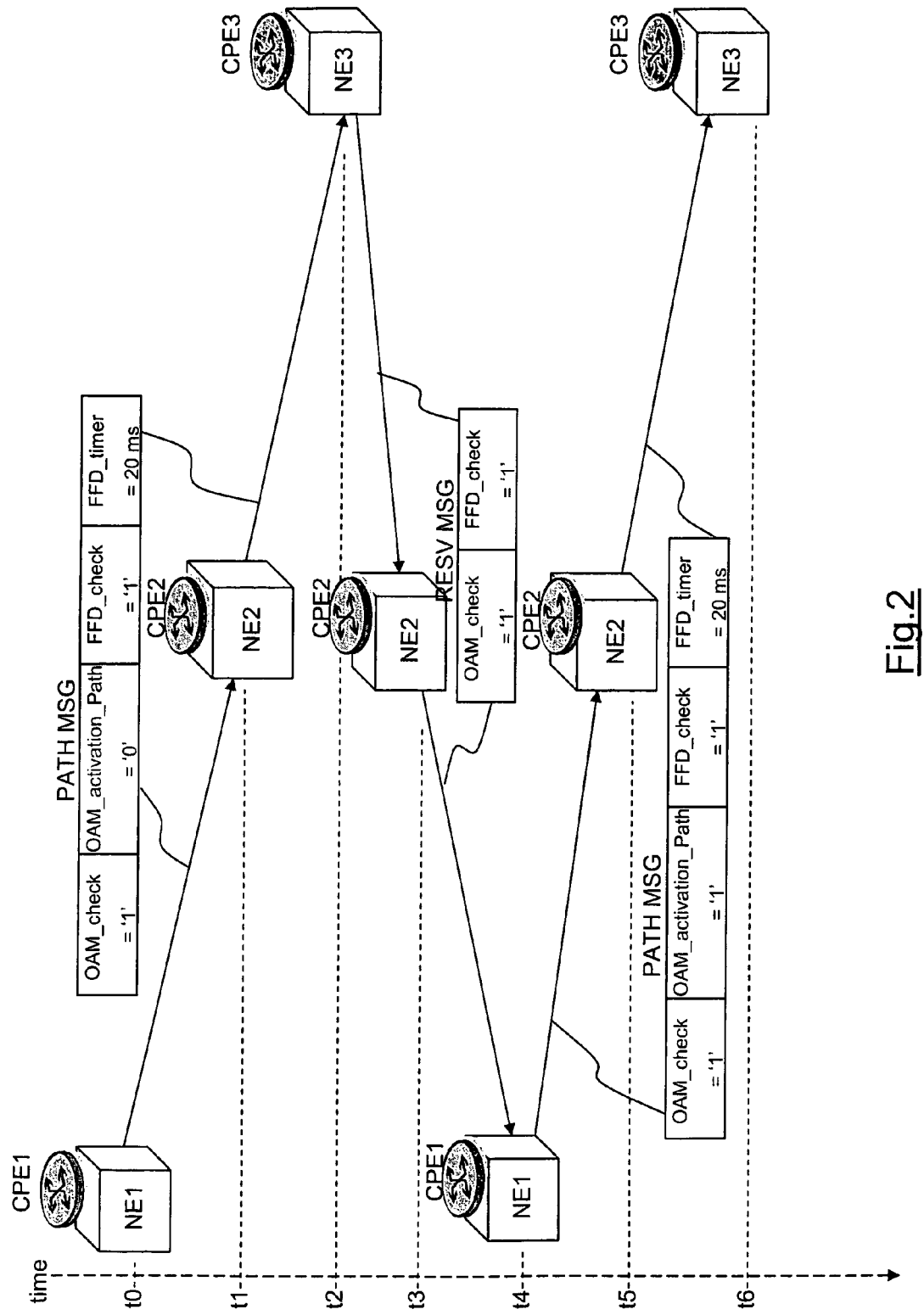
FIG. 2 shows schematically the fields of the new object carried by the messages exchanged between three control plane elements controlling three corresponding network elements of a connection for checking support of configuration of a generation period of MPLS FFD packets equal to 20 milliseconds (ms).

FIG. 2 schematically shows the above two fields, the steps required to check if each network element of the connection supports a generation period of the MPLS FFD packets equal to 20 ms and the corresponding values of the fields. In this example FFD_check is composed of one bit, FFD_timer is composed of three bits (three bits are required because ITU-T Y.1711 indicates 6 possible values of the generation period of the FFD packets: 10 ms, 20 ms, 50 ms, 100 ms, 200 ms, 500 ms). Time evolution of FFD_check of the Path and Resv messages is equivalent to OAM_check of the Path and Resv messages respectiveley, while FFD_timer value indicates the required generation period of the MPLS OAM packets (for example "000"=10 ms, "001"=20 ms, "010"=50 ms, "011"=100 ms, "100"=200 ms, "101"=500 ms); more in general, a field is provided in the Path message for indicating the configuration parameter value. Referring to FIG. 2, at time=t0 CPE1 transmits a Path message to CPE3 to request configuration of the connection and to request if MPLS OAM functions are supported, according to time evolution of OAM_check and OAM_activation_Path of the Path message and OAM_check of the Resv message, as previously explained. At the same time=t0 the FFD_check bit of the Path message is assigned to value '1' for indicating a request of check if the FFD function is supported at each network element of the connection (and, more in general, a field is assigned to request if a configuration parameter of a function is supported). Furthermore, at time=t0 the FFD_timer bits are assigned to "001" (and, more in general, this field is assigned to the configuration parameter value of the specific function) corresponding to value=20 ms: FFD_check in combination with FFD_timer of the Path message indicates the request to check of support of the specific MPLS OAM function (FFD) and of the corresponding configuration parameter value (20 ms). The Path message is received at time=t1 by CPE2, wherein, in case of supporting the MPLS OAM functions, FFD_check and FFD_timer fields of the Path message are neglected, that is they are transmitted to CPE3 unchanged. CPE3 receives at time=t3 this Path message including FFD_check='1' and FFD_timer="001" and, in case of supporting FFD period=20 ms at NE3, transmits the Resv message in the reverse direction towards CPE1, assigning FFD_check='1'; on the contrary, in case of not supporting FFD period=20 ms, transmits the Resv message assigning FFD_check='0' for indicating that the FFD period=20 ms is not supported (so that the default FFD period=50 ms is kept). CPE2 receives at time=t3 the Resv message and transmits it to CPE1 keeping FFD_check unchanged. Finally, if CPE1 receives at time=t4 the Resv message including FFD_check='1', this indicates supporting of FFD generation period=20 ms for the corresponding connection. After receiving the Resv message including OAM_check='1' and FFD_check='1', source CPE1 transmits a Path message including OAM_activation_Path='1' for indicating activation of MPLS OAM functions at each network element of the connection and afterwards starts to transmit FFD packets to NE2 according to a time period=20 ms. At time=t5 intermediate CPE2 receives the Path message including OAM_activation_Path='1', then it transmits the Path message to CPE3 keeping OAM_activation_Path='1' and afterwards starts to transmit FFD packets to NE3 according to a time period=20 ms. Finally, destination CPE3 receives the Path message including OAM_activation_Path='1' and afterwards starts to check if FFD packets are received at NE3 according to time period=20 ms, so that monitoring of the connection from NE1 to NE3 crossing NE2 is activated.

The invention can advantageously be used also for automatic configuration of a connection parameter. For example in a MPLS network a Trail Termination Source Identifier (TTSI) is provided for uniquely identifying a LSP; this identifier can be configured at the source CPE and afterwards transmitted to the destination CPE through a new field of a new object of the Path message, so that the destination CPE can periodically check if the expected TTSI is correctly received from the source CPE.

FIG. 2 shows a first embodiment wherein the specific function and corresponding configuration parameter value is checked during set up of the connection and during the check of support of a generic function, but a second embodiment is possible, wherein support of generic OAM functions is previously checked (by using OAM_check of the Path and Resv messages) and afterwards, in case of supporting generic OAM functions, support of the specific OAM function is checked (by using FFD_check of the Path and Resv messages).

The described solution requires the definition of only one new object (LSP_ADDINFO), carried by both the Path and the Resv messages, including OAM_check, OAM_activation_Path, FFD_check and FFD_timer fields carried by both the messages, but wherein OAM_activation_Path and FFD_timer fields are meaningful only when carried by the Path message; this means that OAM_activation_Path and FFD_timer fields are also carried by Resv message but they are not meaningful. A second alternative solution could be the definition of two different objects, each one identified by a different Class-Num value:

a first object, carried by the Path message and indicated for example with LSP_ADDINFO_Path, including only the OAM_check, OAM_activation_Path and FFD_timer fields;

a second object, carried by the Resv message and indicated for example with LSP_ADDINFO_Resv, including only the OAM_check and FFD_check fields.

This second solution has the advantage to minimize the number of fields carried by the Path and Resv messages required for performing the invention, but it has the disadvantage to be more complex because it requires the definition of two different objects.

The two steps procedure is required only in case the connection is not previously set up; on the contrary, in case the connection at time=t0 is already set up, the check of support of OAM functions is performed through the first Path message transmitted periodically from the source to the destination CPE for refreshing the configuration of the connection, transmitting from the source CPE the Path message including a field (OAM_check) indicating a request of the check (that is assigning OAM_check='1' in the Path message) and activating the OAM function (that is transmission of OAM packets) immediately after the transmission of the request. Accordingly, each intermediate CPE supporting the OAM functions receives the request, transmits it unchanged to the subsequent CPE towards the destination CPE and immediately after the transmission of the request it activates the OAM functions. The destination CPE, supporting the OAM functions, receives the request, transmits in the reverse direction a Resv message including a field (OAM_check) indicating that the request is supported (that is assigning OAM_check='1' in the Resv message) and immediately after the transmission of the request it activates the OAM functions. Finally, the source CPE receives the indication that the OAM functions are supported at each network element of the connection, that is a Resv message including OAM_check='1'. On the contrary, in case the OAM function is not supported at an intermediate network element, the received OAM packet is dropped and the Path message is transmitted to the subsequent network element including OAM_check='0', while in case the OAM function is not supported at a destination network element, the received OAM packet is dropped and the Resv message is transmitted in the reverse direction including OAM_check='0'.

The method can advantageously be used not only for activation of a function, but also for deactivation. Referring specifically to the example of FIG. 1 of OAM functions previously activated through the RSVP protocol, deactivation is performed transmitting from the source to the destination CPE the LSP_ADDINFO object of the Path message including fields OAM_check='0' and OAM_activation_Path='0': when an intermediate or destination CPE detects a change of both OAM_check and OAM_activation_Path of the Path message from '0' to '1', the OAM functions are deactivated. Deactivation of OAM functions can alternatevely be performed deleting the LSP_ADDINFO object from the Path message transmitted from the source to the destination CPE: when an intermediate or destination CPE detects a change from a Path message including the LSP_ADDINFO object to a Path message not including the LSP_ADDINFO object, the OAM functions are deactivated.

The inventive method can be performed through a software program; the programming language of the software program can be for example C or C++. The inventive method can also be performed (through the software program) on a CPE of an ASON network. The CPE includes hardware for performing the method like for example a microprocessor external or embedded into an ASIC (Application Specific Integrated Circuit) or into a FPGA (Field Programmable Gate Array). The microprocessor of a source CPE is adapted to transmit through the signalling protocol the Path message to the destination CPE and to receive through the signalling protocol the Resv message from the destination CPE. The microprocessor of an intermediate CPE is adapted to receive the Path message from the source CPE or from an adiacent intermediate CPE towards the source CPE, to transmit the first message to the destination CPE or to the adiacent intermediate CPE towards the destination CPE, to receive the second message from the destination CPE or from the adiacent intermediate CPE towards the destination CPE and to transmit the second message to the source CPE or to the adiacent intermediate CPE towards the source CPE. The microprocessor of a destination CPE is adapted to receive the Path message from an adiacent CPE and to transmit the Resv message to the adiacent CPE.

The drawings show two different network devices, which are the CPE (for example CPE1) and the controlled NE (NE1), but the two devices can also be included into one device, defined for example network node (NN). Therefore a source network node (indicated with NN1) includes CPE1 and NE1 (controlled by CPE1), a destination network node (NN3) includes CPE3 and NE3 (controlled by CPE3) and an intermediate network node (NN2) includes CPE2 and NE2 (controlled by CPE2).

The invention claimed is:

1. A method for checking support of a function at network nodes of an Automatically Switched Optical Network, the network including:
   a transport plane comprising at least a source network node, a destination network node and at least one intermediate network node arranged for the transport of user signals through the network; and
   a control plane comprising at least a source control plane element, a destination control plane element and at least one intermediate control plane element interconnected through messages of a signaling protocol, for controlling the source network node, the destination network node and the at least one intermediate network node respectively for configuring a connection from the source network node to the destination network node crossing the at least one intermediate network node;
   the method comprising, in case the connection is not configured, the steps of:
   transmitting a first message from the source control plane element to the destination control plane element crossing the at least one intermediate control plane element to indicate a request of the configuration of the connection, that includes a request of the check of support of an operation, administration, and management function of the connection by all network nodes of the connection, said first message including a first field which is unchanged if the operation, administration, and management function is supported between the source network node and the at least one intermediate network node, including the at least one intermediate network node, but the first field indicates that the operation, administration, and management function is not supported if said function is not supported between the source network node and the at least one Intermediate network node, including the at least one Intermediate network node, wherein the connection is a Multi-Protocol Label Switching (MPLS) Label Switched Path (LSP) connection;
   transmitting the first message from the at least one intermediate control plane element to the destination control plane element when the first field is unchanged, indicating that the function is supported and when the first field indicates that the operation, administration, and management function is not supported; and
   receiving at the source control plane element a second message transmitted from the destination control plane element that indicates an answer to the request, the second message including the first field that indicates whether or not the operation, administration, and management function is supported by all the network nodes of the connection.

2. The method of claim 1, in case the connection is previously configured, further comprising the step of:
   performing the activation of the operation, administration, and management function at the source network node upon receiving the second message including the first field indicating that the operation, administration, and management function is supported.

3. The method of claim 1, further comprising, if receiving the second message indicating that the operation, administration, and management function is supported by all the network nodes, the step of:
   transmitting the first message from the source control plane element to the destination control plane element crossing the at least one intermediate control plane element, the first message further including a second field to request activation of the operation, administration, and management function at all the network nodes of the connection.

4. The method of claim 3, further comprising the step of performing the activation of the operation, administration, and management function at the source network node after transmission of the first message including the second field.

5. The method of claim 3, further comprising the step of receiving at an intermediate control plane element the first message including the second field and transmitting to an adjacent control plane element towards the destination control plane element the first message including the second field unchanged.

6. The method of claim 5, further comprising the step of performing the activation of the operation, administration, and management function at all intermediate network nodes after transmission of the first message including the second field.

7. The method of claim 3, the first message further comprising a third field that indicates if a specific operation, administration, and management function for the connection and if a configuration parameter value of the specific operation, administration, and management function are supported by all the network nodes of the connection.

8. The method of claim 1, wherein the first message further includes a third field that indicates a request of check of support of a specific operation, administration, and management function for the connection and a fourth field that indicates a configuration parameter value of the specific operation, administration, and management function; and
   the second message further includes the third field that indicates if the configuration parameter value is supported.

9. The method of claim 1, further comprising, after transmission of the first message, the steps of:
   receiving at an intermediate control plane element the first message from the source control plane element or from an adjacent intermediate control plane element towards the source control plane element and transmitting the first message to the destination control plane element or to an adjacent control plane element towards the destination control plane element, wherein:

in case of supporting the operation, administration, and management function by all the network nodes comprised between the source network node and the at least one intermediate network node and including the at least one intermediate network node, transmitting the first message including the first field unchanged;

in case of not supporting the operation, administration, and management function by at least one network node comprised between the source network node and the at least one intermediate network node and including the at least one intermediate network node, transmitting the first message including the first field indicating that the operation, administration, and management function is not supported;

receiving at the intermediate control plane element the second message from the destination control plane element or from the adjacent control plane element towards the destination control plane element and transmitting to the source control plane element or to the adjacent control plane element towards the source control plane element the second message including the first field unchanged.

10. The method of claim 1, further comprising the following steps after transmission of the first message from the source control plane element or from an intermediate control plane element:

receiving the first message at the destination control plane element and transmitting the second message to an adjacent control plane element towards the source control plane element, wherein:

in case of supporting the operation, administration, and management function, transmitting the second message including the first field that indicates the operation, administration, and management function is supported by all the network nodes;

in case of not supporting the operation, administration and management function, transmitting the second message including the first field that indicates the operation, administration, and management function is not supported by at least one network node.

11. The method of claim 1, wherein the first message and the second message include a fifth field that indicates the network nodes of the connection not supporting the operation, administration, and management function.

12. The method of claim 1, wherein the network includes a layer compliant to Multi-Protocol Label Switching.

13. The method of claim 1, wherein the network includes a layer compliant to Ethernet protocol.

14. Source control plane element including hardware adapted to perform the method of claim 1, the source control plane element including a processor adapted to transmit through the signalling protocol the first message to the destination control plane element to indicate the request of the check of support of the operation, administration, and management function of the connection by all the network nodes of the connection and adapted to receive through the signalling protocol the second message from the destination control plane element to indicate if the operation, administration, and management function is supported.

15. Source network node including a source control plane element according to claim 14 and including a source network node controlled by the source control plane element.

16. The method of claim 1 wherein the first message is a modified version of a Resource Reservation Protocol-Traffic Engineering (RSVP-TE) protocol.

17. The method of claim 1 wherein the network nodes belong to different network domains.

18. The method of claim 1 wherein the first message contains one or more fields to mark network nodes which do not support the operation, administration, and management function.

19. The method of claim 1 wherein the request of the configuration of the connection is for a defined quality of service.

20. Intermediate control plane element controlling an intermediate network node of an Automatically Switched Optical Network for configuration of a connection, wherein the connection includes source and destination network nodes and source and destination control plane elements, and wherein the connection crosses the intermediate network node, comprising:

a processor adapted to receive a first message transmitted from the source control plane element toward the destination control plane element, to indicate a request of the configuration of the connection, including a request of a check of support of an operation, administration, and management function by all network nodes of the connection, said first message including a first field which is unchanged if the operation, administration, and management function is supported between the source network node and the intermediate network node, including the intermediate network node, but the first field indicates that the operation, administration, and management function is not supported if said function is not supported between the source network node and the intermediate network node, including the intermediate network node, wherein the connection is a Multi-Protocol Label Switching (MPLS) Label Switched Path (LSP) connection;

the processor being responsive to the received first message and adapted to transmit the first message further toward the destination control plane element, including the first field unchanged to indicate if the operation, administration, and management function is supported by all the network nodes between the source network node and the intermediate network node and including the intermediate node, and with the first field changed that indicates the operation, administration, and management function is not supported if said function is not supported between the source network node and the intermediate network node, including the intermediate node;

the processor being adapted to receive, after transmission of the first message, a second message transmitted from the destination control plane element toward the source control plane element indicating an answer to the request, the second message including the first field to indicate whether or not the operation, administration, and management function is supported by all the network nodes of the connection; and the processor being responsive to the received second message and adapted to transmit the second message further toward the source control plane element, including the first field unchanged.

21. Intermediate network node including the intermediate control plane element according to claim 20 and including the intermediate network node controlled by the intermediate control plane element.

22. A destination control plane element that controls a destination network node of an Automatically Switched Optical Network for configuration of a connection to the destination network node, comprising:

a processor adapted to receive a first message that indicates a request of the configuration of the connection, the first message including a first field to indicate a request of a check of support of an operation, administration, and management function by all network nodes of the connection, said first message including a first field which is unchanged if the operation, administration, and management function is supported between a source network node and the destination network node, including the destination node, but the first field indicates that the operation, administration, and management function is not supported if said function is not supported between the source network node and the destination node, including the destination node, said first message being transmitted to the destination control plane element whether or not the operation, administration, and management function is supported by all the network nodes of the connection, wherein the connection is a Multi-Protocol Label Switching (MPLS) Label Switched Path (LSP) connection;

the processor being responsive to the received first message and adapted to transmit a second message that indicates an answer to the request, the second message including the first field to indicate whether or not the operation, administration, and management function is supported by all the network nodes of the connection.

23. Destination network node including a destination control plane element according to claim 22 and including the destination network node controlled by the destination control plane element.

* * * * *